INVENTOR.
Bela G. Lindenfeld
ATTORNEYS.

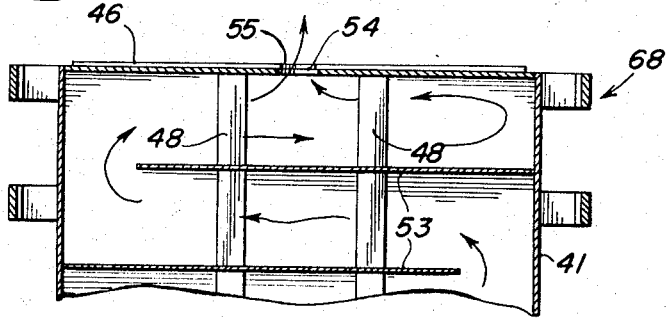
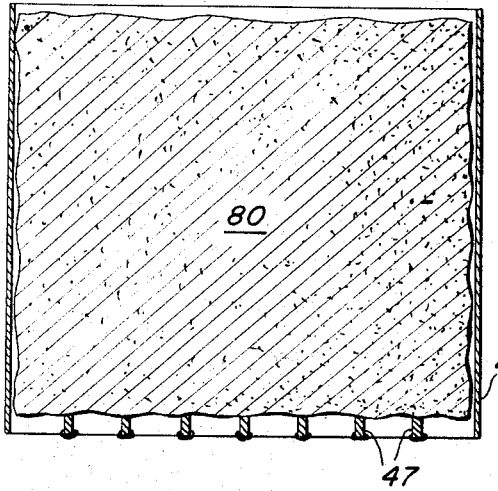
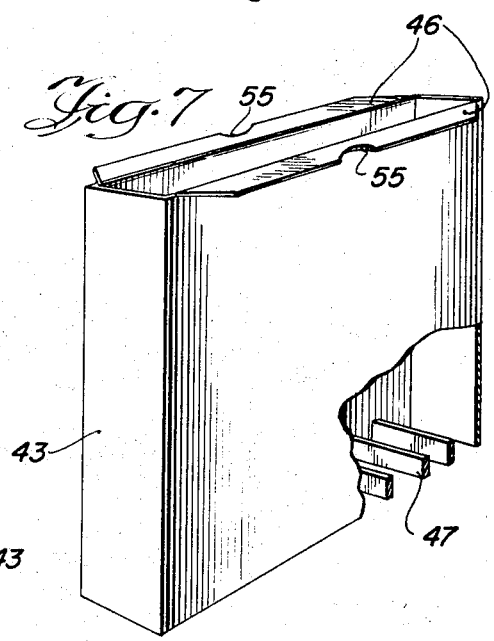
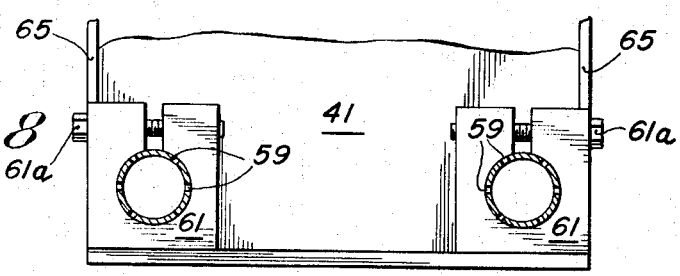

3,362,399
PREHEATER DEVICE AND APPARATUS FOR APPLYING STRIPING MATERIAL INCLUDING SAME
Bela G. Lindenfeld, St. Joseph, Mich., assignor, by mesne assignments, to The Perma-Line Company, a partnership composed of Seymour R. Gross, W. William Pattis, and Simon Zunamon, trustees, Chicago, Ill.
Filed Jan. 29, 1965, Ser. No. 428,897
13 Claims. (Cl. 126—343.5)

ABSTRACT OF THE DISCLOSURE

A preheater device for preheating thermoplastic material associated with apparatus for applying the material to a road surface and having a reservoir wherein the preheater device premelts the thermoplastic materials before it enters the reservoir of the apparatus.

---

This invention relates to improvements in apparatus for applying thermoplastic striping material to a road surface. The invention further relates to a device for preheating thermoplastic material for use by such apparatus.

It is known to lay a thermoplastic material from an applicator device as a marking on a road surface in the form of a stripe or the like, and efficient road stripers have been provided for this purpose. For example, see Lipkins U.S. Patent No. 3,070,822, and Angelini, U.S. Ser. No. 288,009, filed June 14, 1963, now U.S. Patent No. 3,266,392, dated Aug. 16, 1966, entitled, "Road Striping Apparatus." Such stripers will usually include a wheeled carriage supporting a reservoir tank for liquid or molten thermoplastic material and an applicator system for receiving the thermoplastic material from the tank and laying the material, e.g. by extrusion through a die, on the road surface in the form of a stripe. A burner is normally provided for maintaining the thermoplastic material in liquid state in the tank, and the road striper carries a supply of fuel for the burner.

It has been found when using such road stripers, particularly in view of improved efficiency and higher speed of operation, that the heating capacity of the reservoir tank may not be able to keep up with the need or demand for molten material by the applicator system.

It is a general object of this invention to provide a road striping apparatus having a preheater for preheating thermoplastic material to be introduced into a reservoir tank in the applicator.

Another object is to provide a road striping apparatus in accordance with the foregoing object wherein the preheater is mounted over the top or inlet of the tank for receiving and melting solid thermoplastic material and permitting flow of the resulting melt into the reservoir.

It is also an object of this invention to provide a new and useful preheater for use with a road striping apparatus.

Another object is to provide such a preheater which is capable of receiving and retaining solid thermoplastic material, melting the material and directing the resulting melt to the reservoir tank of the road striping apparatus, e.g. by directing gravity flow.

Still another object is to provide a preheater in accordance with the foregoing objects which can be conveniently and safely operated to supply makeup resin melt to the reservoir tank of the road striping apparatus so that cooling of a mass of resin already in the tank instantaneously to an undesired temperature is avoided so that the striping apparatus can be operated on a continuous basis without undue down time for melting resin within the tank.

Yet another object is to provide a preheater in accordance with the foregoing objects which is readily cleanable after operation.

Further objects and advantages will become apparent from the following detailed description taken in connection with the accompanying drawings in which:

FIGURE 5 is a fragmentary section along line 5—5 of FIGURE 3;

FIGURE 6 is a section along line 6—6 of FIGURE 3;

FIGURE 7 is a perspective view of a reservoir in the preheater of FIGURE 3; and

FIGURE 8 is a fragmentary section along line 8—8 of FIGURE 4.

Figure 1:
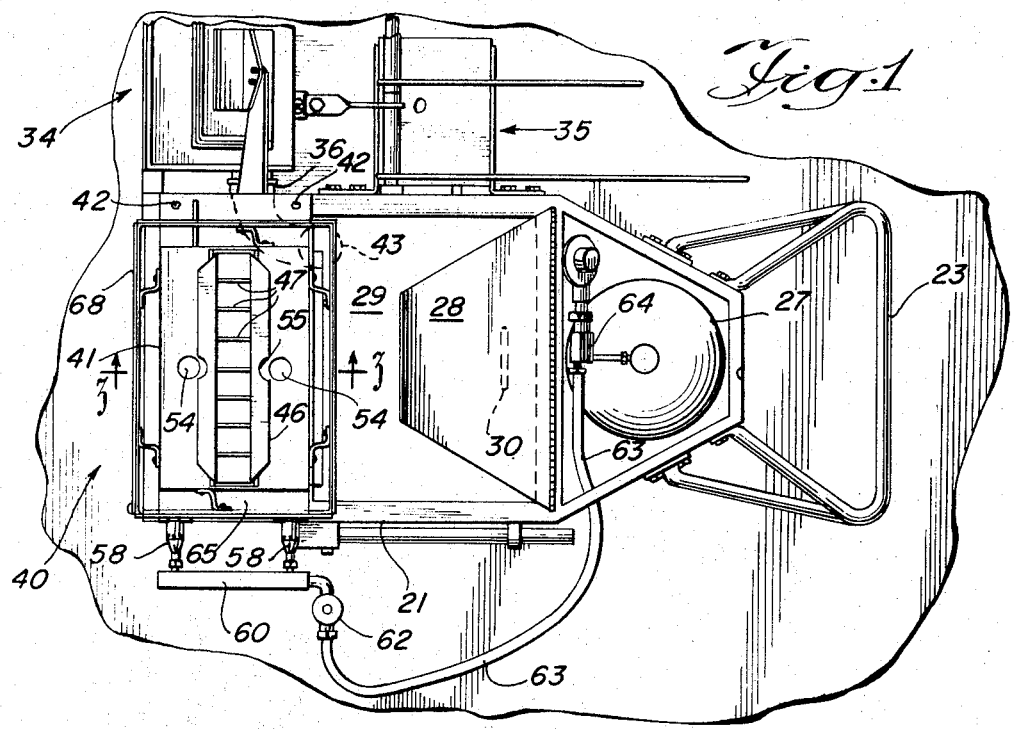
FIGURE 1 is a top plan view of a road striping apparatus.

While this invention is susceptible of embodiment in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

The present invention provides a road striping apparatus having a preheater for preheating solid thermoplastic material, preferably to a melt state, i.e. in or above the melting range but below a temperature which may destroy the material, before the material is introduced into a thermoplastic material reservoir tank of the striping apparatus. In a preferred form, the preheater includes a receiver in the form of a fistulous member defining a passage from an inlet end to an outlet end, a combustion chamber for heating the walls of the receiver, and means, preferably at the outlet end of the receiver, for retaining solid thermoplastic material in the receiver while permitting the flow of liquid or molten thermoplastic material from the outlet end. The receiver is preferably vertically mounted above the reservoir tank of the road striping apparatus, with the inlet end disposed upwardly and the outlet end disposed downwardly for directing or permitting passage of melt into the reservoir tank.

The preheater, in the preferred form, is capable of heating solid thermoplastic material within the receiver to a temperature above its melting point so that the thermoplastic material melts between its entry into and its exit from the receiver.

The thermoplastic material can be any thermoplastic striping material which is solid or substantially solid at room temperature and is heated to a liquid or melt state for application to a road surface. Such materials are well known to those in the road striping art. For example, the material may contain, as a base or carrier, a hot fluid solventless settable synthetic plastic resin in which there is dispersed an extender or aggregate, such as pulverulent dolomite, and a pigment. Normally such materials are heated to their extrusion temperature, e.g. in the range of 320° F. to 430° F., or higher or lower, to a melt state for application to the road surface. Other extrusion temperatures may be applicable when using other thermosetting materials. For suitable useful thermoplastic materials, reference may be made to the aforementioned Lipkins U.S. Patent No. 3,070,822.

Figure 2:
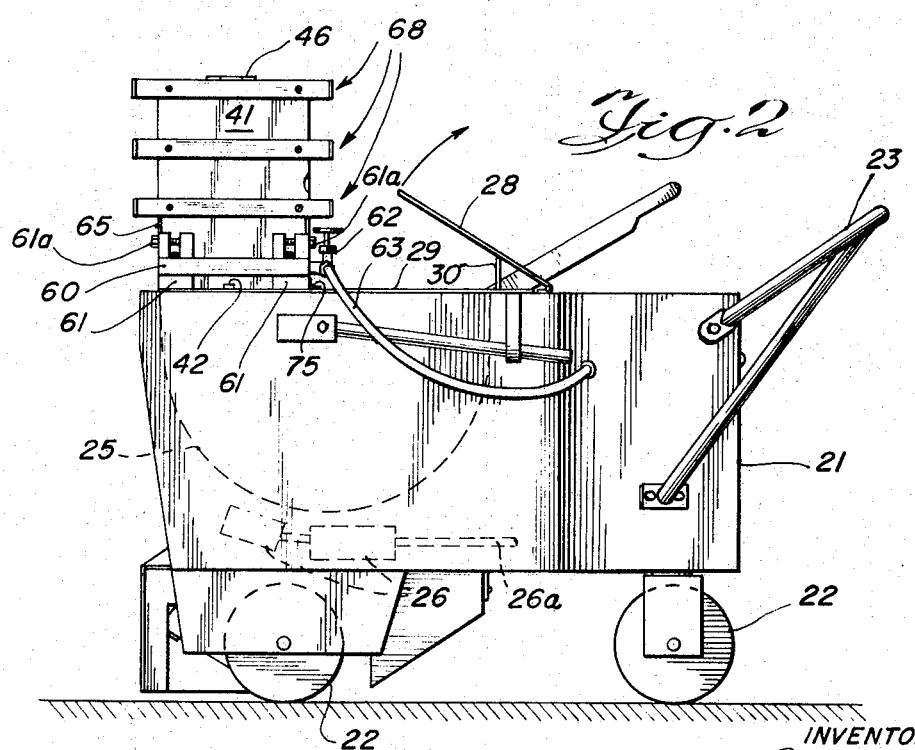
FIGURE 2 is a side elevation view of the apparatus of FIGURE 1.

Referring first to FIGURES 1 and 2, the illustrated form of striping apparatus includes a carriage having a body or housing 21 supported on wheels 22 and a gripping bar 23 secured to housing 21 for moving the carriage. In housing 21 there is mounted a reservoir indicated at 25 which usually contains an agitating mechanism for agitating liquid resin therein. A burner 26 is mounted for heating resin in tank 25, and a propane tank 27 is mounted in a tank compartment of housing 21 having a hinged cover 28, shown in open position. Propane tank 27 supplies propane by suitable gas lines, e.g. as at 26a, to burner 26.

On the top of housing 21 an insulating cover 29, having an air space confined between top and bottom plates of the cover, is mounted. Cover 29 has a grippable handle 30 and is suitably hinged, as will be seen, for moving the cover to open or close tank 25.

Mounted to the side of housing 21 is a stripe laying system 34 which receives fluid thermoplastic material from tank 25 through a conduit 36 and lays the material on pavement or other surfaces in the form of a stripe having a width and thickness determined by dies within system 34. A bead dispensing system 35 is also secured to one side of housing 21 immediately behind the stripe laying system 34. Bead dispensing system 35 contains a supply of glass beads and may also be provided with a heater for heating the glass beads. The bead dispensing system dispenses beads onto the stripe laid by the stripe laying system 34. A suitable stripe laying system and bead dispensing system and controls therefor, as well as a suitable carriage, propane supply tank, resin reservoir tank, discharge conduits from the reservoir tank to the stripe laying system, gas supply tubes and the like, are fully described in the aforementioned Lipkins U.S. Patent No. 3,070,822 and Angelini, Ser. No. 288,009, now U.S. Patent No. 3,266,392, dated Aug. 16, 1966.

Figure 3:
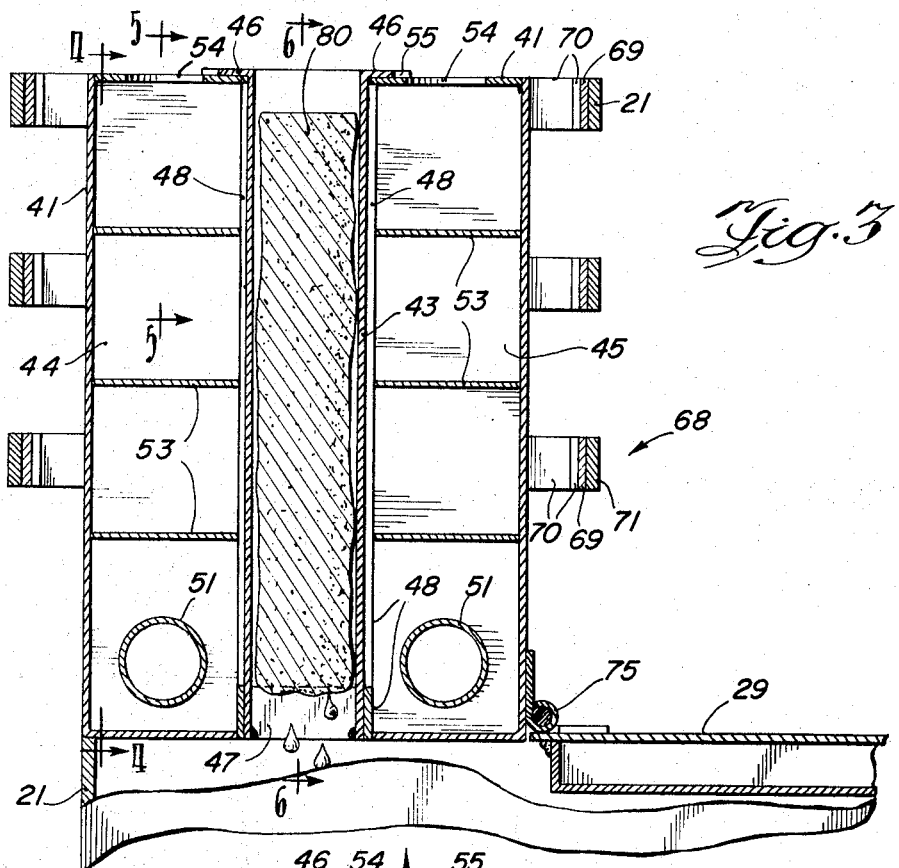
FIGURE 3 is a section along line 3—3 in FIGURE 1 showing internal structure of a preheater mounted on the apparatus in FIGURE 1.

Mounted on the top of housing 21 and in direct flow communication with an uncovered portion of tank 25 is an embodiment of the preheater useful in the present invention for preheating the thermoplastic material, usually to a melt, prior to entry of the material into a reservoir tank. The preheater is indicated generally at reference numeral 40 and includes a casing 41, e.g. of aluminum, secured to a top lip of housing 41 by suitable bolts 42 through lower flanges 41a of casing 41. As best seen in FIGURES 1 and 3, casing 41 has a central vertical opening through which is slidably fitted, as a removable insert, a receiver or holder 43, e.g. of aluminum, for receiving and holding solid thermoplastic material. Receiver 43 has side walls defining a rectangular tube member. Between the inserted receiver 43 and the walls of casing 41 there are a plurality of air flow chambers (in the form of chambers) 44 and 45. The walls of casing 41 have outwardly turning top flanges 46 which rest upon the top of casing 41 at the central opening therethrough with receiver 43 inserted within casing 41. Receiver 43 is slidably removable from the top of casing 41 for cleaning or the like as desired or needed.

A plurality of spaced parallel bars 47 extend between and are secured to opposite side walls of receiver 43 to form a support for block of solid thermoplastic material within receiver 43. Guide and support bars 48 are provided for guiding the side walls of receiver 43 during insertion and removal.

Figure 4:
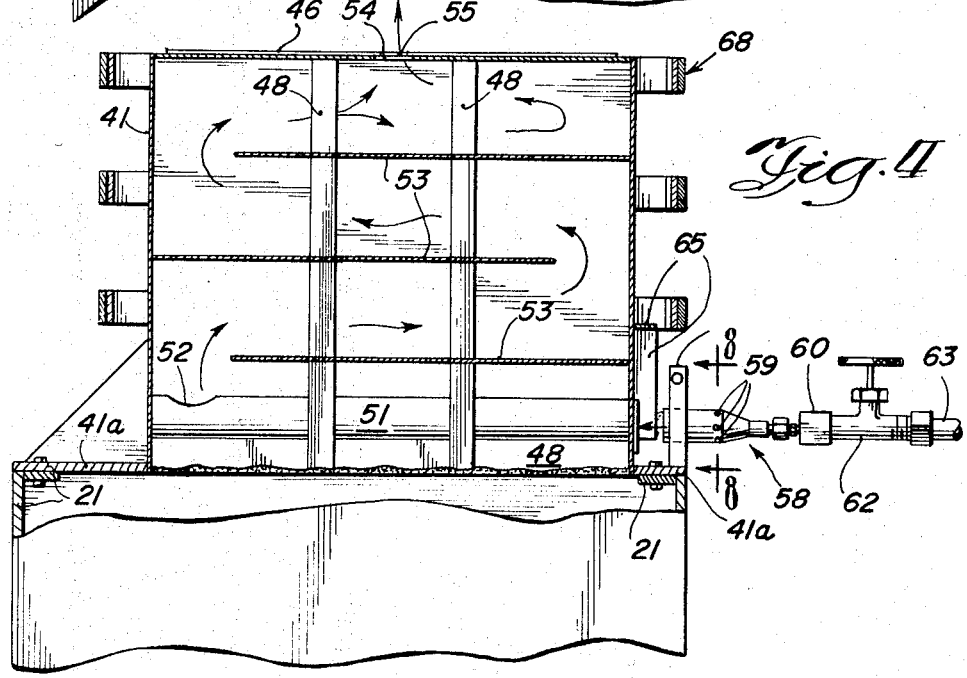
FIGURE 4 is a section through the preheater along line 4—4 of FIGURE 3.

Within each flow chamber 44 or 45, a fire tube 51 is mounted and extends horizontally across the flow chamber in the lower portion thereof. Each fire tube 51 includes an outlet port 52 (as best seen in FIGURES 3 and 4), and each chamber 44 or 45 includes a plurality of baffle plates 53 above fire tube 51 for directing combustion gases from port 52 through a convoluted path within the chamber and finally out of the chamber through an exhaust opening 54 in the top wall of casing 41. Flanges 46 have cut-away portions 55 for minimizing blockage of flow from ports 54. The convoluted path of the combustion gases from ports 52 to ports 54, as caused by baffles 53, provides longer residence of combustion gases and excellent heat exchange of the combustion gases with the walls of holder 43 prior to exhausting the gases from the chambers 44 and 45.

A plurality of burner nozzles 58, one for each fire tube 51, having air intake ports 59 and supplied with propane gas from a manifold 60, are mounted by a clamp 61, secured to flange 41a with the end of each nozzle disposed for directing combustion gases into one of fire tubes 51. Bolts 61a of clamp 61 are tightened to secure the nozzles in proper position, and the nozzles may be slidably withdrawn from clamp 61 for cleaning or the like by removing or loosening bolts 61a.

Manifold 60 has a manually operable flow control valve 62 at the inlet thereof which is connected to a gas supply tube 63, e.g. a high pressure flexible rubber tube, extending to a T connector 64 and thence through a valve on propane tank 27 for supplying manifold 60 and burners 58 with propane from tank 27. A shield member 65 is secured to casing 41 around the area of burners 58.

A plurality of protecting fins 68 are also provided, each surrounding casing 41, for protecting the operator against severe burn should he come into contact with the preheater device during its operation. Each of protecting fins 68 includes an inner metal frame member 69, e.g. of aluminum, surrounding and supported from casing 41 by spacer brackets 70. An asbestos or other heat resistant metal layer 71 is secured to the outer surface of each metal frame member 69 and by suitable bolts, so that normal contact with the preheater device from any side thereof will be blocked by the heat resistant insulating layer 71.

The cover 29 for the remaining portion of tank 25, i.e. the portion not covered by the preheater 40, is secured to casing 41 by a hinge 75 for opening and closing the top of tank 25 with preheater 40 in place.

In operation of the device, the burner 26, and any other burners used in the device, are lit in the usual manner. When the operator is ready to begin laying a stripe, valve 62 is opened slightly and burners 58 are immediately ignited by applying a flame. Care should be taken not to flood chambers 44 and 45 with combustible gas prior to lighting burners 58 due to the danger of blow-back. Valve 62 is then adjusted to give the desired burner flame. A solid cake of thermoplastic material 80 is then inserted into receiver 43 from the top or inlet thereof. The cake 80 is blocked from falling into tank 25 by bars 47, and the cake is heated by the walls of receiver 43, i.e. by heat exchange through the walls with chambers 44 and 45. As the thermoplastic material melts, the melt flows by gravity from the cake between bars 47 at the bottom or outlet of the receiver and into tank 25 to replenish the supply of thermoplastic material within tank 25 as the material is used during the striping operation. When the cake 80 drops a sufficient amount beneath the top or inlet of receiver 43, another cake may be inserted on top of it while operation of the device is continued. When the striping operation is near completion, burners 58 can be shut off and the residual cake within receiver 43 can continue to feed, although at a slower rate, due to heat retained in the receiver walls and heat rising from tank 25.

After each day's operation of the device, and after the preheater 40 has cooled, holder 43 is removed and can be soaked in methylethylketone or other suitable cleaning solvent for easy and thorough cleaning.

I claim:

1. An apparatus for laying road striping material from a melt state, which comprises a wheeled carriage, a reservoir tank for containing a melt of striping material, first burner means for heating said tank, fuel supply means for supplying propane fuel to said burner, applicator means for applying a stripe of striping material melt from said reservoir tank to a road surface therebelow, a grippable bar for moving the carriage along the road surface while the stripe is being laid, a casing removably mounted on said carriage above said reservoir tank, a receiver in said casing for receiving and containing a solid block of striping material having an outlet for discharging molten striping material by free fall to said reservoir tank, means at said outlet for supporting the solid block against falling to said reservoir tank, means on said receiver for removably supporting said receiver in said casing, second burner means mounted in said casing for heating said receiver to melt solid striping material, and conduit means for directing propane gas from said fuel supply means to said second burner means.

2. An apparatus for laying thermoplastic road striping material from a melt state, which apparatus includes a wheeled carriage, a reservoir tank having an inlet for receiving and containing a melt of thermoplastic material, means for heating said tank, fuel supply means for supplying propane fuel to said burner, applicator means for applying a stripe of thermoplastic material melt from said reservoir tank to a road surface therebelow, a grippable bar for moving the carriage along the road surface while the stripe is being laid, a preheater having a casing, a receiver mounted in the casing for receiving solid thermoplastic material, heater means for melting thermoplastic material in said receiver, outlet means in said receiver for releasing molten thermoplastic material, means mounting said casing to said carriage in a position covering a portion of the inlet of said reservoir tank with the receiver outlet directed into said inlet, cover means for the remainder of said reservoir tank inlet, and hinge means mounting said cover means on said casing for movement to open and close said remainder of said inlet.

3. A preheater device for preheating thermoplastic road striping material for use with road striping apparatus for laying a stripe of the thermoplastic road striping material from a melt in a reservoir tank to a road surface which device comprises heat conductive wall means defining a rectangular tube member having an inlet end for receiving a solid block of thermoplastic material and an outlet end, casing means defining a combustion chamber on the exterior of said rectangular tube member for contacting said rectangular tube member with combustion gases and for removably mounting said rectangular tube member generally vertical with the inlet end disposed upwardly and the outlet end disposed downwardly, fire tube means in said combustion chamber for receiving combustion gases, burner means for introducing combustion gases through said fire tube means and into said combustion chamber for heating said rectangular tube member, means at the outlet end of said rectangular tube member for blocking the passage of the solid block of thermoplastic material therefrom, and means for mounting said casing means on the road striping apparatus, whereby with said burner means ignited said rectangular tube member is heated so that a solid block of thermoplastic material received at said inlet is heated to a melt within said rectangular tube member and the melt is delivered by free fall from the rectangular tube member outlet to the road striping apparatus.

4. A preheater device for preheating thermoplastic road striping material for use with an apparatus for laying a stripe of the thermoplastic road striping material from a melt in a reservoir tank to a road surface, which device comprises heat conductive wall means defining a tube member for holding a solid block of thermoplastic material and having an inlet end for receiving the solid block and an outlet end, casing means defining a combustion chamber for contacting the outside of said tube member with combustion gases, burner means for introducing combustion gases into said combustion chamber for heating said tube member, means at the outlet end of said tube member for blocking the passage of said block therefrom and means for removably mounting said casing means on the stripe laying apparatus for delivery of liquefied striping material thereto.

5. A preheater device for preheating thermoplastic road striping material for use with an apparatus for laying a stripe of the thermoplastic road striping material from a melt in a reservoir tank to a road surface, which device comprises heat conductive wall means defining a tube member having an inlet end for receiving a solid block of thermoplastic material and an outlet end, casing means defining a combustion chamber bordered by said tube member for contacting said tube member with combustion gases, fire tube means in said combustion chamber, burner means for introducing combustion gases into said fire tube means for heating said tube member and means for removably mounting said casing means on the stripe laying apparatus for delivery of liquefied striping material thereto.

6. The device of claim 5 including heat resistant insulating fender means secured to and spaced outwardly from said casing.

7. A preheater device for preheating thermoplastic road striping material for use with an apparatus for laying a stripe of the thermoplastic road striping material from a melt in a reservoir tank to a road surface, which device comprises: a receiver comprises a tube member having walls and two open ends defining an inlet for receiving a solid block of thermoplastic material and an outlet for delivering heated thermoplastic material, a casing having walls and opening means for removably receiving said receiver as an insert in said casing in a position with said inlet accessible via said opening means for introducing solid thermoplastic material and said outlet accessible via said opening means for delivering heated material, means for removably supporting said receiver in said position in said casing, means for heating solid thermoplastic material in said receiver between said inlet and outlet and means for removably mounting said casing means on the stripe laying apparatus for delivery of liquefied striping material thereto.

8. The device of claim 7 wherein said casing includes side, top and bottom walls, said opening means comprises an opening in each of said top and bottom walls, said receiver walls are side walls defining said inlet at the top of said receiver and said outlet at the bottom of said receiver, and said supporting means comprises flange means extending outwardly from said side walls at said inlet for supporting said receiver from the casing top wall adjacent the top wall opening.

9. The device of claim 8 wherein side walls of said receiver when in said position are spaced from side walls of said casing defining a combustion chamber therebetween, and said heating means comprises burner means for burning fuel in and supplying hot combustion gases to the combustion chamber.

10. The device of claim 12 including guide means secured to the top and bottom casing walls and extending from the casing top opening to the casing bottom opening for guiding said receiver to said position upon insertion through the casing top wall opening.

11. A preheater device for preheating thermoplastic road striping material for use with an apparatus for laying a stripe of the thermoplastic road stripping material from a melt in a reservoir tank to a road surface, which device comprises: a receiver having a heat transferring wall, an inlet for receiving a solid block of thermoplastic material and an outlet for discharging molten thermoplastic material, a casing having walls for receiving said receiver as an upstanding insert with said inlet and outlet freely accessible at the top and bottom of said casing respectively and with walls of said receiver spaced inwardly of walls of said casing, defining combustion gas flow chamber means therebtween, means for removably supporting said receiver in said casing, guide means for guiding the receiver during insertion into and removal from said casing, fire tube means in said flow chamber means having an inlet end extending to the outside of said casing and having exhaust port means in said chamber means, exhaust port means from said chamber means through the casing, baffle means in said chamber means secured to said casing walls and said guide means for conducting combustion gases from the fire tube exhaust port in a circuitous path in contact with said receiver wall and to the chamber exhaust port, separate burner means for said fire tube means, means for directing and controlling flow of fuel to said burner means including manually operable control valve means, means releasably and adjustably mounting said burner means for directing combustion gases into the inlet of the fire tube means, and heat resistant insulating fender means on the outside of said casing.

12. An apparatus for laying thermoplastic road striping material from a melt state, which comprises a wheeled carriage, a reservoir tank for containing a melt of thermoplastic material, means for heating said tank, applicator means for applying a stripe of thermoplastic melt from said servoir to a road surface therebelow, a casing removably mounted on said carriage above said reservoir tank, a receiver in said casing for receiving and containing a solid thermoplastic material and having an outlet for discharging molten material by free fall to said reservoir tank, and means in said casing for heating said receiver to melt the solid thermoplastic material.

13. A preheater device for preheating thermoplastic road striping material for use with an apparatus for laying a stripe of the thermoplastic road striping material from a melt in a reservoir tank to a road surface, which device comprises: a receiver having a transferring wall, an inlet for receiving solid thermoplastic material and an outlet for discharging molten thermoplastic material, a casing having walls for receiving said receiver as an insert with said inlet and outlet freely accessible at the top and bottom of said casing respectively and with walls of said receiver spaced inwardly of walls of said casing, defining combustion gas flow chamber means therebetween, means for removably supporting said receiver in said casing, guide means for guiding the receiver during insertion into and removal from the casing, and baffle means in said chamber means secured to said guide means for conducting combustion gases in a circuitive path through said chamber means and in contact with said receiver wall.

References Cited
UNITED STATES PATENTS

| | | | |
|---|---|---|---|
| 1,855,961 | 4/1932 | Hargrove | 126—343.5 |
| 2,041,359 | 5/1936 | Littleford | 127—343.5 |
| 2,648,264 | 8/1953 | Green | 126—343.5 X |
| 2,728,336 | 12/1955 | Elgeti | 126—343.5 |
| 3,070,822 | 1/1963 | Lipkins | 15—503 |

FOREIGN PATENTS

| | | |
|---|---|---|
| 694,967 | 8/1940 | Germany. |
| 377,873 | 7/1964 | Switzerland. |

CHARLES J. MYHRE, *Primary Examiner.*